(12) United States Patent
Alonso et al.

(10) Patent No.: US 9,286,619 B2
(45) Date of Patent: Mar. 15, 2016

(54) SYSTEM AND METHOD FOR GENERATING SOCIAL SUMMARIES

(75) Inventors: Omar Alonso, Redwood Shores, CA (US); Karen Shiells, Menlo Park, CA (US); Ho John Lee, Palo Alto, CA (US); Chad Carson, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 494 days.

(21) Appl. No.: 12/979,232

(22) Filed: Dec. 27, 2010

(65) Prior Publication Data

US 2012/0166931 A1    Jun. 28, 2012

(51) Int. Cl.
| | | |
|---|---|---|
| *G06F 17/00* | (2006.01) | |
| *G06Q 30/02* | (2012.01) | |
| *G06Q 50/00* | (2012.01) | |
| *G06Q 50/30* | (2012.01) | |
| *G06F 17/27* | (2006.01) | |
| *G06F 3/0484* | (2013.01) | |

(Continued)

(52) U.S. Cl.
CPC ............ *G06Q 30/0201* (2013.01); *G06Q 50/01* (2013.01); *G06Q 50/30* (2013.01); *G06F 3/038* (2013.01); *G06F 3/0481* (2013.01); *G06F 3/0482* (2013.01); *G06F 3/04812* (2013.01); *G06F 3/04842* (2013.01); *G06F 17/2725* (2013.01)

(58) Field of Classification Search
CPC ............ G06F 17/2725; G06F 3/04842; G06F 3/04812; G06F 3/0481; G06F 3/038; G06F 3/0482

USPC ......... 715/213, 750–758, 237, 273, 805, 862, 715/759; 705/14.23
See application file for complete search history.

(56) References Cited

U.S. PATENT DOCUMENTS

| | | |
|---|---|---|
| 7,239,708 B2 | 7/2007 | England et al. |
| 7,580,931 B2 | 8/2009 | Liu |

(Continued)

FOREIGN PATENT DOCUMENTS

| | | |
|---|---|---|
| KR | 20120137542 A | 12/2012 |
| WO | 2012171073 A1 | 12/2012 |

OTHER PUBLICATIONS

David Pinto et al., "Clustering Narrow-Domain Short Texts by Using the Kullback-Leibler Distance"—Published 2007 pp. 611-622 by Springer.*

(Continued)

*Primary Examiner* — Quoc A Tran
(74) *Attorney, Agent, or Firm* — Dave Ream; Tom Wong; Micky Minhas

(57) ABSTRACT

The described implementations relate to communication platforms that are provided over computer networks. One implementation provides a system that can include a storage component configured to store a plurality of communications having a common connector. The system can also include a score computation component that is configured to compute scores reflecting semantic relationships between individual communications from the plurality of communications. The system can also include a summary generation component that is configured to select one or more of the individual communications, based on the scores, and generate a summary of the common connector. The summary can represent the selected individual communications. The system can also include at least one processor configured to execute one or more of the components.

20 Claims, 9 Drawing Sheets

(51) Int. Cl.
  *G06F 3/0481* (2013.01)
  *G06F 3/038* (2013.01)
  *G06F 3/0482* (2013.01)

(56) References Cited

U.S. PATENT DOCUMENTS

| | | |
|---|---|---|
| 7,584,183 B2 | 9/2009 | Hegerty |
| 7,600,017 B2 | 10/2009 | Holtzman et al. |
| 7,818,334 B2 | 10/2010 | Najork |
| 7,930,302 B2* | 4/2011 | Bandaru et al. ............... 707/737 |
| 8,010,460 B2 | 8/2011 | Work |
| 8,312,056 B1 | 11/2012 | Peng et al. |
| 8,326,880 B2 | 12/2012 | Carson et al. |
| 8,543,454 B2 | 9/2013 | Fleischman et al. |
| 8,606,792 B1 | 12/2013 | Jackson et al. |
| 8,655,938 B1 | 2/2014 | Smith et al. |
| 2002/0062368 A1 | 5/2002 | Holtzman et al. |
| 2003/0097655 A1 | 5/2003 | Novak |
| 2003/0221166 A1 | 11/2003 | Farahat |
| 2004/0128273 A1 | 7/2004 | Amitay |
| 2005/0114896 A1 | 5/2005 | Hug et al. |
| 2005/0159970 A1 | 7/2005 | Buyukkokten et al. |
| 2005/0251487 A1 | 11/2005 | Evans et al. |
| 2005/0273629 A1 | 12/2005 | Abrams et al. |
| 2006/0004691 A1 | 1/2006 | Sifry |
| 2006/0042483 A1 | 3/2006 | Work et al. |
| 2006/0184464 A1 | 8/2006 | Tseng |
| 2006/0184481 A1 | 8/2006 | Zhang |
| 2006/0242078 A1 | 10/2006 | Evans et al. |
| 2006/0242554 A1 | 10/2006 | Gerace et al. |
| 2007/0083469 A1 | 4/2007 | Kaufman |
| 2007/0118498 A1 | 5/2007 | Song |
| 2007/0198510 A1 | 8/2007 | Ebanks |
| 2007/0204078 A1 | 8/2007 | Boccon-Gibod et al. |
| 2007/0271272 A1 | 11/2007 | McGuire et al. |
| 2008/0066181 A1 | 3/2008 | Haveson et al. |
| 2008/0070209 A1 | 3/2008 | Zhuang et al. |
| 2008/0071904 A1 | 3/2008 | Schuba |
| 2008/0109399 A1* | 5/2008 | Liao et al. ...................... 707/2 |
| 2008/0168523 A1 | 7/2008 | Ansari et al. |
| 2008/0187231 A1 | 8/2008 | Barbieri |
| 2008/0222044 A1 | 9/2008 | Gottlieb et al. |
| 2008/0256051 A1 | 10/2008 | Liu |
| 2009/0006371 A1 | 1/2009 | Denoue |
| 2009/0006398 A1 | 1/2009 | Lam |
| 2009/0037382 A1 | 2/2009 | Ansari et al. |
| 2009/0048904 A1 | 2/2009 | Newton |
| 2009/0048990 A1 | 2/2009 | Gross |
| 2009/0049018 A1 | 2/2009 | Gross |
| 2009/0091443 A1 | 4/2009 | Chen |
| 2009/0144418 A1* | 6/2009 | Alstyne et al. ............... 709/224 |
| 2009/0164904 A1* | 6/2009 | Horowitz et al. ............ 715/723 |
| 2009/0171748 A1 | 7/2009 | Aven et al. |
| 2009/0208180 A1 | 8/2009 | Ashby |
| 2009/0217343 A1 | 8/2009 | Bellwood et al. |
| 2009/0240944 A1 | 9/2009 | Cho et al. |
| 2009/0276500 A1 | 11/2009 | Karmarkar |
| 2009/0312033 A1* | 12/2009 | Shen et al. ................. 455/456.1 |
| 2010/0119053 A1 | 5/2010 | Goeldi |
| 2010/0121707 A1 | 5/2010 | Goeldi |
| 2010/0121849 A1 | 5/2010 | Goeldi |
| 2010/0138903 A1 | 6/2010 | Medvinski |
| 2010/0228614 A1 | 9/2010 | Zhang et al. |
| 2010/0228631 A1 | 9/2010 | Zhang et al. |
| 2010/0268830 A1* | 10/2010 | McKee et al. ................ 709/228 |
| 2011/0022602 A1 | 1/2011 | Luo |
| 2011/0178995 A1 | 7/2011 | Suchter et al. |
| 2011/0218960 A1* | 9/2011 | Hatami-Hanza ............. 707/603 |
| 2011/0231296 A1 | 9/2011 | Gross et al. |
| 2011/0246484 A1 | 10/2011 | Dumais |
| 2011/0270845 A1 | 11/2011 | Lin et al. |
| 2011/0271232 A1 | 11/2011 | Crochet et al. |
| 2012/0059710 A1 | 3/2012 | Dutta |
| 2012/0110464 A1 | 5/2012 | Chen et al. |
| 2012/0117059 A1* | 5/2012 | Bailey et al. ................. 707/723 |
| 2012/0150754 A1 | 6/2012 | Belady et al. |
| 2012/0209832 A1 | 8/2012 | Neystadt et al. |
| 2012/0209920 A1 | 8/2012 | Neystadt et al. |
| 2012/0215597 A1 | 8/2012 | Ross |
| 2012/0221559 A1 | 8/2012 | Kidron |
| 2012/0226536 A1 | 9/2012 | Kidron |
| 2012/0254184 A1 | 10/2012 | Choudhary et al. |
| 2012/0317200 A1 | 12/2012 | Chan |
| 2012/0324023 A1 | 12/2012 | Di Sciullo et al. |
| 2012/0331399 A1 | 12/2012 | Eidelson et al. |
| 2013/0006736 A1 | 1/2013 | Bethke et al. |
| 2013/0013678 A1 | 1/2013 | Murthy |
| 2013/0014223 A1 | 1/2013 | Bhatia et al. |
| 2013/0041860 A1 | 2/2013 | Lawrence et al. |
| 2013/0054591 A1 | 2/2013 | Park et al. |
| 2013/0054631 A1 | 2/2013 | Govani et al. |
| 2013/0066706 A1 | 3/2013 | Wu et al. |
| 2013/0066711 A1 | 3/2013 | Llyanage et al. |
| 2013/0085838 A1 | 4/2013 | Tennenholtz et al. |
| 2013/0097180 A1 | 4/2013 | Tseng |
| 2013/0117097 A1 | 5/2013 | Bachman |
| 2013/0117364 A1 | 5/2013 | Bania et al. |
| 2013/0124626 A1 | 5/2013 | Cathcart et al. |
| 2013/0151345 A1 | 6/2013 | Brelig |
| 2013/0151348 A1 | 6/2013 | Paul et al. |
| 2013/0173333 A1 | 7/2013 | Zhang et al. |
| 2013/0173485 A1 | 7/2013 | Ruiz et al. |
| 2013/0179440 A1 | 7/2013 | Gordon |
| 2013/0197970 A1 | 8/2013 | Aaskov et al. |
| 2013/0212479 A1 | 8/2013 | Willis et al. |
| 2013/0254280 A1 | 9/2013 | Yang et al. |
| 2013/0311563 A1 | 11/2013 | Huberman et al. |
| 2014/0089059 A9 | 3/2014 | Vesely et al. |
| 2014/0189000 A1 | 7/2014 | Zhang et al. |
| 2014/0189536 A1 | 7/2014 | Lange et al. |

OTHER PUBLICATIONS

Park, at el., "Web Content Summarization Using Social Bookmarking Service", Retrieved at << http://research.nii.ac.jp/TechReports/08-006E.pdf >>, NII Technical Report, Apr. 23, 2008, pp. 5.

Xu, at el., "Using Social Annotations to Improve Language Model for Information Retrieval", Retrieved at << http://delivery.acm.org/10.1145/1330000/1321596/p1003-xu.pdf?key1=1321596&key2=6764264821&coll=GUIDE&dl=GUIDE&CFID=102040425&CFTOKEN=89989322 >>, Proceedings of the sixteenth ACM conference on Conference on information and knowledge management, Date: Nov. 6-9, 2007, pp. 1003-1006.

Hu, at el., "Comments-Oriented Blog Summarization by Sentence Extraction", Retrieved at << http://www.cais.ntu.edu.sg/~meishan/publications/cikm307s-hu.pdf >>, Conference on Information and Knowledge Management, Nov. 6-10, 2007, pp. 901-904.

Zhu, at el., "Tag-Oriented Document Summarization", Retrieved at << http://www2009.org/proceedings/pdf/p1195.pdf >>, Proceedings of the 18th international conference on World wide web, Apr. 14, 2009, pp. 1195-1196.

Sharifi, at el., "Summarizing Microblogs Automatically", Retrieved at << http://www.aclweb.org/anthology/N/N10/N10-1100.pdf >>, HLT '10 Human Language Technologies: The 2010 Annual Conference of the North American Chapter of the Association for Computational Linguistics, Jun. 2010, pp. 685-688.

Zhou, at el., "On the Summarization of Dynamically Introduced Information: Online Discussions and Blogs", Retrieved at << http://www.isi.edu/natural-language/people/hovy/papers/06SprSymp-weblog.pdf >>, AAAI Symposium on Computational Approaches to Analysing Weblogs AAAI-CAAW, 2006, pp. 6.

Balahur, at el., "Summarizing Threads in Blogs Using Opinion Polarity", Retrieved at << http://www.aclweb.org/anthology/W/W09/W09-4304.pdf >>, Proceedings of the International Workshop 'Events in Emerging Text Types (eETTs)', 2009, pp. 23-31.

Chitu, "Google to Launch a Microblogging Search Engine", Jun. 13, 2009.

Wesley, "Microsoft's Bing Search Engine to Index Microblogging and Twitter Tweets", Jul. 2, 2009.

Grosseck, "Indicators for the Analysis of Learning and Practice Communities from the Perspective of Microblogging as a Provocative Sociolect in Virtual Space", Apr. 9-10, 2009.

(56) References Cited

OTHER PUBLICATIONS

Nair, "How to Remove Duplicate Content From Your Blogger Blog Posts to Avoid SERP Penalty", Oct. 26, 2008.
Java, "Why We Twitter: Understanding Microblogging Usage and Communities", Aug. 12, 2007.
Kelkar, "Visualizing Search Results as Web Conversations", Apr. 20-24, 2009.
David, "Using Micro-Blogging to Record Architectural Design Conversation Alongside the BIM", May 11, 2009.
Sysomos, "Judging a Twitter User by Their Followers", Jun. 2010.
Customerthink, "Author Ranking System", Aug. 6, 2010.
Straw, "3 Quick Ways to Check Your Twitter Ranking/Reach/Authority", Jan. 12, 2009.
Elsas, "Search in Conversational Social Media Collections", Feb. 3, 2010.
Gill, "How Can We Measure the Influence of the Blogosphere?", May 17-22, 2004.
Spinn3r, "Spinn3r", Jun. 13, 2009.
Peerindex, "About Your PeerIndex Score", Aug. 6, 2010.
Weng, "Twitterrank: Finding Topic-Sensitive Influential Twitterers", Feb. 4-6, 2010.
Zaman, "Information Extraction with Network Centralities: Finding Rumor Sources, Measuring Influence, and Learning Community Structure", Sep. 2011.
Tang, "Social Influence Analysis in Large-Scale Networks", Jun. 28-Jul. 1, 2009.
Tan, "User-Level Sentiment Analysis Incorporating Social Networks", Aug. 21-24, 2011.
Pal, "Identifying Topical Authorities in Microblogs", 2011.
Microsoft, "Infer.NET", Jan. 18, 2012.
Gryc, "Leveraging Textual Sentiment Analysis with Social Network Modelling", Apr. 9-10, 2010.
Gao, "Ranking on Large-Scale Graphs with Rich Metadata", Mar. 28-Apr. 1, 2011.
Balkir, "Big Data: Simulating Secondary Sort on Values with Hadoop", Jan. 26, 2010.
Afrati, "Optimizing Joins in a Map-Reduce Environment", Aug. 24-28, 2009.
U.S. Appl. No. 12/753,909, filed Apr. 5, 2010, Carson.
U.S. Appl. No. 12/691,145, filed Jan. 21, 2010, Suchter.
U.S. Appl. No. 12/942,577, filed Nov. 9, 2010, Bailey.
Cao, "Density-Based Clustering over an Evolving Data Stream with Noise," Apr. 20, 2006.
Hore, "Creating Streaming Iterative Soft Clustering Algorithms," Jul. 16, 2007.
Barecke, "Summarizing Video Information Using Self-Organizing Maps," Fuzzy Systems, Jul. 16, 2006.
Hore, "A Fuzzy C Means Variant for Clustering Evolving Data Streams," Oct. 7, 2007.
Nassar, "Effective Summarization of Multi-Dimensional Data Streams for Historical Stream Mining," In Proceedings of the 19th International Conference on Scientific and Statistical Database Management, Jul. 9, 2011.
Jiang, "Data Stream Clustering and Modeling Using Context-Trees," Jun. 8, 2009.
Yeh, "Clustering Over Multiple Data Streams," Oct. 28, 2007.
Digital Video Broadcasting, "DVB: IP Datacast over DVB-H: Service Purchase and Protection", DVB Document A100, Jul. 2009.
Valverde et al., "Digital Rights Management", Master's Thesis, Report No. LITH-ISY-EX-3423-2003, Jul. 15, 2003.
International Search Report & Written Opinion for PCT Patent Application No. PCT/US2013/078394, Mailed Date: Aug. 13, 2014, 10 Pages.
Yang, et al., U.S. Appl. No. 13/427,584, filed Mar. 22, 2012, pp. 1-34.
Lange, et al., U.S. Appl. No. 13/733,009, filed Jan. 2, 2013, pp. 1-52.
Zhang, et al., U.S. Appl. No. 13/733,034, filed Jan. 2, 2013, pp. 1-53.
Final Office Action of U.S. Appl. No. 13/733,009, mailed on Jan. 27, 2015, Lange, et al, "Social Media Impact Assessment", 24 pages.
Non-Final Office Action of U.S. Appl. No. 13/427,584, mailed on Oct. 26, 2014, Yang, et al, "Identifying Influential Users of a Social Networking Service", 9 pages.
Response to Non-Final Office Action of U.S. Appl. No. 13/427,584 mailed Oct. 26, 2014, dated Jan. 6, 2015, Yang, et al, "Identifying Influential Users of a Social Networking Service", 13 pages.
Non-Final Office Action of U.S. Appl. No. 13/427,584, mailed on Jul. 1, 2013, Yang, et al, "Identifying Influential Users of a Social Networking Service", 9 pages.
Response to Non-Final Office Action of U.S. Appl. No. 13/427,584 mailed Jul. 1, 2013, dated Sep. 26, 2013, Yang, et al, "Identifying Influential Users of a Social Networking Service", 11 pages.
Final Office Action of U.S. Appl. No. 13/427,584, mailed on Jan. 16, 2014, Yang, et al, "Identifying Influential Users of a Social Networking Service", 9 pages.
Response to Final Office Action of U.S. Appl. No. 13/427,584 mailed Jan. 16, 2014, dated Feb. 10, 2014, Yang, et al, "Identifying Influential Users of a Social Networking Service", 11 pages.
Non-Final Office Action of U.S. Appl. No. 13/427,584, mailed on Mar. 14, 2014, Yang, et al, "Identifying Influential Users of a Social Networking Service", 9 pages.
Response to Non-Final Office Action of U.S. Appl. No. 13/427,584 mailed Mar. 14, 2014, dated May 30, 2014, Yang, et al, "Identifying Influential Users of a Social Networking Service", 11 pages.
Final Office Action of U.S. Appl. No. 13/427,584, mailed on Jun. 19, 2014, Yang, et al, "Identifying Influential Users of a Social Networking Service", 8 pages.
Response to Final Office Action of U.S. Appl. No. 13/427,584 mailed Jun. 19, 2014, dated Sep. 19, 2014, Yang, et al, "Identifying Influential Users of a Social Networking Service", 11 pages.
Supplemental Response to Final Office Action of U.S. Appl. No. 13/427,584 mailed Oct. 6, 2014, dated Feb. 24, 2015, Yang, et al, "Identifying Influential Users of a Social Networking Service", 12 pages.
Non-Final Office Action of U.S. Appl. No. 13/733,009, mailed on May 22, 2014, Lange, et al, "Social Media Impact Assessment", 25 pages.
Response to Non-Final Office Action of U.S. Appl. No. 13/733,009 mailed on May 22, 2014, dated May 22, 2014, Lange, et al, "Social Media Impact Assessment", 26 pages.
Non-Final Office Action of U.S. Appl. No. 13/733,034, mailed on Sep. 12, 2014, Zhang, et al, "Social Media Impact Assessment", 24 pages.
Response to Non-Final Office Action of U.S. Appl. No. 13/733,034 mailed on Sep. 12, 2014, dated Zhang, et al, "Social Media Impact Assessment", 27 pages.
International Search Report & Written Opinion Received for PCT Application No. PCT/US2013/078395, Mailed Date: Oct. 31, 2014, 12 Pages.
Response to Non-Final Office Action filed Mar. 11, 2014 to Non-Final Office Action mailed Dec. 19, 2013 from U.S. Appl. No. 12/942,577, 17 pages.
Notice of Allowance mailed Apr. 7, 2015 from U.S. Appl. No. 12/942,577, 9 pages.
Final Office Action mailed Apr. 6, 2015 from U.S. Appl. No. 13/427,584, 14 pages.
International Search Report and Written Opinion mailed Aug. 13, 2014 from International Patent Application No. PCT/US2013/078394, 10 Pages.
Restriction Requirement mailed Mar. 13, 2012 from U.S. Appl. No. 12/753,909, 7 Pages.
Reply to the Restriction Requirement filed Apr. 4, 2012 to the Restriction Requirement mailed Mar. 13, 2012 from U.S. Appl. No. 12/753,909, 9 Pages.
Non-Final Rejection mailed Apr. 18, 2012 from U.S. Appl. No. 12/753,909, 10 pages.
Amendment and Response filed Jul. 17, 2012 to Non-Final Rejection mailed Apr. 18, 2012 from U.S. Appl. No. 12/753,909, 8 pages.
Notice of Allowance mailed Aug. 1, 2012 from U.S. Appl. No. 12/753,909, 5 pages.
Response filed Jul. 9, 2015 to Final Office Action mailed Apr. 6, 2015 from U.S. Appl. No. 13/427,584, 11 pages.

(56) References Cited

OTHER PUBLICATIONS

Final Office Action mailed Aug. 14, 2015 from U.S. Appl. No. 13/733,034, 22 pages.
Response filed Jun. 25, 2015 to to Final Office Action mailed Jan. 27, 2015 from U.S. Appl. No. 13/733,009, 17 pages.
Notice of Allowance mailed Jul. 7, 2015 from U.S. Appl. No. 13/733,009, 7 pages.
"InnovationQ—IP.com", retrieved Jun. 28, 2015, https://iq.ip.com/discover, 7 pages.
Notice of Allowance with Applicant Initiated Interview Summary mailed Aug. 21, 2015 from U.S. Appl. No. 13/427,584, 10 pages.
Notice of Allowance mailed Oct. 29, 2015 from U.S. Appl. No. 13/733,009, 7 pages.
Notice of Allowance mailed Jan. 12, 2016 from U.S. Appl. No. 12/972,577, 29 pages.

* cited by examiner

US 9,286,619 B2

SYSTEM AND METHOD FOR GENERATING SOCIAL SUMMARIES

BACKGROUND

The Internet provides various opportunities for individuals to discuss subjects that interest them. For example, users may participate in message boards, maintain a blog, comment on various webpages (e.g., Facebook™ "walls," Youtube™ comments, etc.), or participate in a real-time messaging service such as Twitter™. A user who is interested in comments made by others on a particular topic can use these technologies to stay up to date on the latest discussions.

In some cases, users will include information such as hashtags in their comments to help other users identify the topic or topics that are being discussed. Thus, other users who are interested in a particular topic can search for comments that include the hashtag to find out more about the topic. Likewise, users can include web links that are associated with a particular topic in their comments. However, often the number of comments that reference a particular hashtag or web link can grow quite large. Due to the large number of comments, it may be relatively burdensome for the user to understand the major points of discussion associated with a particular hashtag or web link.

SUMMARY

This document relates to communication platforms that are provided over computer networks. One implementation is manifested as a system that can include a storage component configured to store a plurality of communications having a common connector. The system can also include a score computation component that is configured to compute scores reflecting semantic relationships between individual communications from the plurality of communications. The system can also include a summary generation component that is configured to select one or more of the individual communications based on the scores, and generate a summary of the common connector. The summary can represent the selected individual communications. The system can also include at least one processor configured to execute one or more of the components.

Another implementation is manifested as a technique that can include identifying a characteristic of a plurality of communications having a common connector. The technique can also include sorting the plurality of communications into at least a first group having first values for the characteristic and a second group having second values for the characteristic, and generating a first summary for the first group. The first summary can represent at least two of the communications from the first group. The technique can also include generating a second summary for the second group, and the second summary can represent at least two of the communications from the second group.

Another implementation is manifested as a technique that can include storing communications, and filtering the communications to identify a subset of the communications that include a common hashtag or web link. The technique can also include computing similarity scores for the identified subset of the communications, and the similarity scores can reflect semantic similarities among individual communications of the subset. The technique can also include computing diversity scores for the identified subset of the communications, and the diversity scores can reflect semantic differences among individual communications of the subset. The technique can also include combining the similarity scores and the diversity scores to determine total scores for the identified subset of communications, selecting one or more of the individual communications, based on the total scores, and generating a summary of the common hashtag or web link. The summary can represent the selected individual communications.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This document relates to communication platforms, and more specifically to using certain techniques to summarize communications made by users in a social networking context.

Generally speaking, users can submit communications to a communication platform. The communications can include social "connectors," such as web links or hashtags, that identify topics of interest such as news items, celebrities, or other topics that are discussed by the users. More generally, connectors can be any part of a communication that can be used to identify a particular topic. For example, individual words, letters, or combinations thereof could also serve as connectors.

A summary of a connector can be generated by identifying communications that include the connector, and selecting one or more representative communications that have semantic relationships with the other communications that include the connector. Thus, a user having the summary can understand the dominant themes of the discussion without necessarily having to read all of the communications that include the connector.

Figure 1:
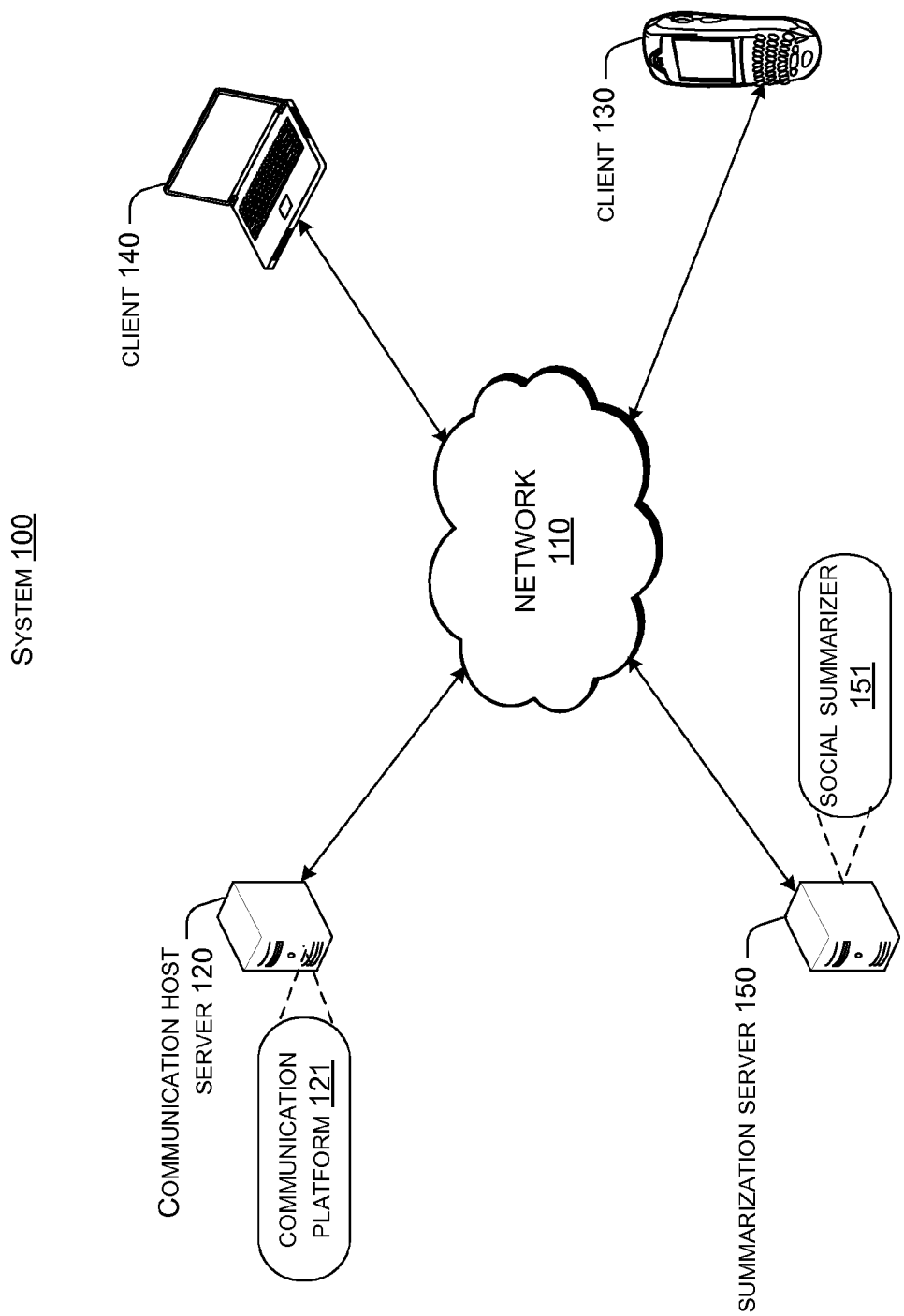
FIG. 1 shows an example of an operating environment in accordance with some implementations of the present concepts.

For purposes of explanation, consider introductory FIG. 1. FIG. 1 shows an exemplary system 100 that is consistent with the disclosed implementations. As shown in FIG. 1, system 100 includes a network 110 connecting numerous devices, such as a communication host server 120, client devices 130 and 140, and a summarization server 150. As discussed in more detail below, each device shown in FIG. 1 can include one or more processing devices, such as computer processors, executing instructions in a computer-readable storage medium such as a memory.

Communication host server 120 may host a communication platform 121. For example, communication host server 120 may host a social communications platform such as a message board, a blog or microblog, social networking accounts (e.g., Facebook™), a real-time messaging service (e.g., Twitter™), a web page that accepts user comments (e.g., Youtube™), or other communications platform. Generally speaking, communication platform 121 allows users to submit and/or retrieve communications such as comments that are added to a web page, "tweets," message board or forum posts, "wall" postings, blog posts, or other types of feedback or updates.

In some implementations, communication host server 120 can allow users to submit communications which are subsequently accessible by other users. For example, users may submit comments about a web page that may be made accessible to other users as soon as the other users access or refresh the web page. As another example, users may submit tweets about a particular topic, which may be transmitted to other users via Short Message Service ("SMS"). In some cases the communications can be made immediately available, e.g., immediately posted to a web page. In other cases, the communications can require approval by a moderator or other entity before becoming available to other users. The communications can also be communicated to users as part of a feed on a particular topic to which the users have subscribed.

Client devices 130 and 140 can be configured to retrieve communications such as user feedback and/or comments from communication host server 120. For example, client devices 130 and 140 can access communication host server 120 to receive communications submitted by other users to communication platform 121, as mentioned above. Client devices 130 and 140 can also be configured to submit communications to communication platform 121.

Generally speaking, client devices 130 and 140 may communicate with communication host server 120 using a wide range of technologies. Example technologies include transmission control protocol/internet protocol ("TCP/IP") and/or hypertext transfer protocol ("HTTP") connections, ethernet, feeds (e.g., Atom, Really Simple Syndication or "RSS"), email, messaging services such as SMS and Multimedia Messaging Service ("MMS"), etc. Client devices 130 and 140 may include various applications that implement these technologies. For example, client devices 130 and 140 may include browser software that implements HTTP communications for users to read message board postings, tweets, blog entries, web page comments, etc. Likewise, client devices 130 and 140 may include SMS and/or MMS applications for "tweeting," email applications, etc.

Note also that the technology used by a client device to submit a particular communication is not necessarily the same technology that is used to retrieve the communication. For example, client device 130 may tweet about a particular topic using SMS. Communication platform 121 may receive the tweet using SMS. However, communication platform 121 does not necessarily send the tweet to other user devices via SMS. Instead, for example, communication platform 121 may provide access to the tweet via a web page, and client device 140 may submit an HTTP GET request to retrieve the tweet from the web page. However, in some implementations, the same technology may be used to submit and retrieve a particular communication.

Summarization server 150 can be configured to summarize communications that are submitted to communication host server 120. For example, social summarizer 151 on summarization server 150 can be configured to process a number of user communications provided by users of client devices 130 and 140, and generate a summary of the communications. In some implementations, the summary may relate to a number of communications that each include and/or reference an individual "connector," such as a web page link (e.g., a uniform resource locator or "URL") or a Twitter™ hashtag.

Figure 2:
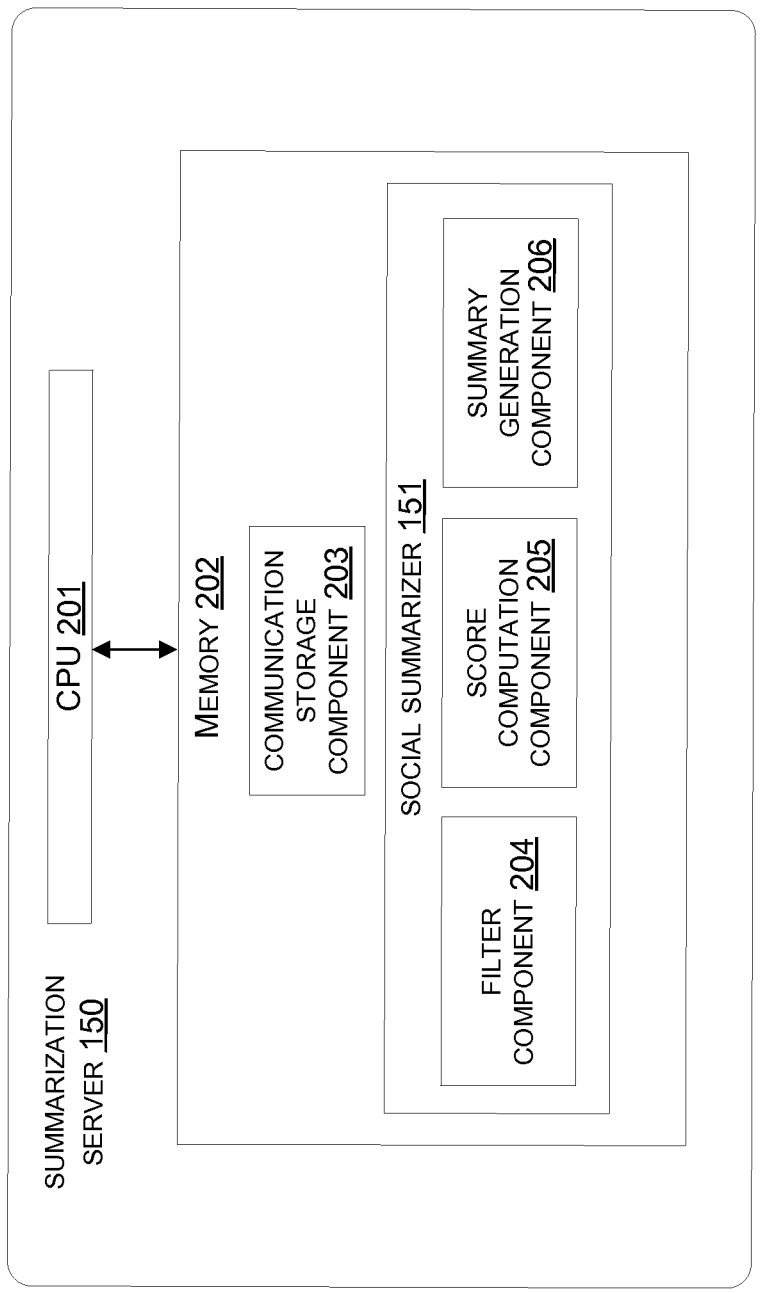
FIG. 2 shows exemplary components of a device in accordance with some implementations of the present concepts.

FIG. 2 shows an exemplary architecture of summarization server 150 that is configured to accomplish the concepts described above and below. Summarization server 150 can include a central processing unit ("CPU") 201, operably connected to a memory 202. For example, CPU 201 can be a reduced instruction set computing (RISC) or complex instruction set computing (CISC) microprocessor that is connected to memory 202 via a bus. Memory 202 can be a volatile storage device such as a random access memory (RAM), or non-volatile memory such as FLASH memory. Although not shown in FIG. 2, summarization server 150 can also include various input/output devices, e.g., keyboard, mouse, display, printer, etc. Furthermore, summarization server 150 can include one or more non-volatile storage devices, such as a hard disc drive (HDD), optical (compact disc/digital video disc) drive, tape drive, etc. Generally speaking, any data processed by summarization server 150 can be stored in memory 202, and can also be committed to non-volatile storage. Client devices 130 and 140 and communication host server 120 can have similar hardware components as summarization server 150.

Memory 202 of summarization server 150 can include various components that implement certain processing described herein. For example, memory 202 can include social summarizer 151, which is configured to generate summaries of communications that are submitted to communication platform 121. Social summarizer 151 can include a filter component 204, a score computation component 205, and a summary generation component 206. Memory 202 can also include a communication storage component 203, which can be configured to store communications such as those submitted to communication host server 120. Components 151 and 203-206 can include instructions stored in one or more computer-readable storage media such as memory 202, and these instructions can be read and executed by central processing unit (CPU) 201. Furthermore, components 151 and 203-206 can also be stored in other computer-readable storage media, such as the aforementioned non-volatile storage devices, and retrieved to memory 202 to implement the processing described herein.

As mentioned above, communication storage component 203 can be configured to store communications submitted by client devices 130 and 140 to communication host server 120. For example, communication storage component 203 may be configured to retrieve the communications from communication host server 120 after they are submitted by various users. Alternatively, communication storage component 203 may be configured to receive the communications directly from client devices 130 and 140. The various technologies discussed above may be used to receive the communications, e.g., TCP/IP, feeds, email, etc.

Filter component 204 can be configured to filter communications that are stored by communication storage component 203. For example, filter component 204 can filter the communications to identify a subset of individual communications that each include a reference to one or more connectors. Score computation component 205 can be configured to compute scores for each of the filtered communications. For example, score computation component 205 can be configured to compute scores reflecting semantic relationships between two or more communications. The scores can be based on similarity metrics that reflect the similarity of communications to one another, and/or diversity metrics that reflect the differences between communications. Summary generation component 206 can be configured to generate a summary of the one or more connectors. For example, summary generation component 206 can be configured to select one or more of the communications to include in the summary, based on the computed scores.

Note that social summarizer 151 is described below with respect to implementations on summarization server 150. However, social summarizer 151 can be embodied on various types of devices. For example, social summarizer 151 can be collocated on communication host server 120 to summarize communications hosted thereon. Social summarizer 151 can also be embodied on other processing devices with access to the communications, such as a personal computer (PC), laptop, cell phone, personal digital assistant ("FDA"), etc.

Furthermore, the functionality described herein with respect to social summarizer 151 can be distributed across multiple devices. For example, filter component 204 could be embodied on a first device, score computation component 205 could be embodied on a second device, and summary generation component 206 could be embodied on a third device. Furthermore, social summarizer 151 or the individual components thereof (203-206) can be distributed across multiple devices, e.g., in a server farm, one or more server racks, across several web or application servers, etc.

Figure 3:
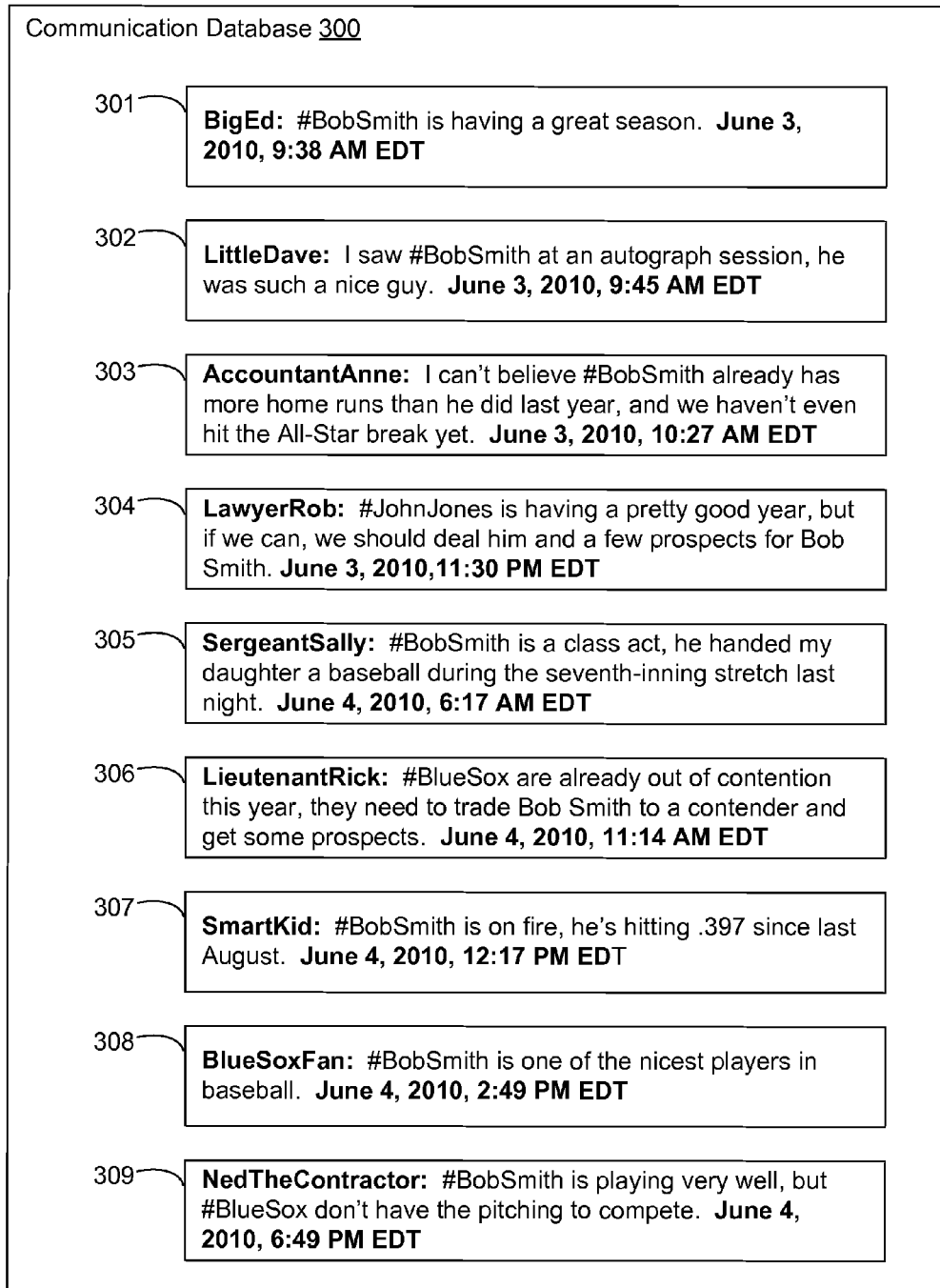
FIG. 3 shows an example of a data structure in accordance with some implementations of the present concepts.

FIG. 3 illustrates an exemplary communication database 300. Communication database 300 can be maintained by communication storage component 203 of summarization server 150. For example, communication database 300 may be maintained as a text file, a structured query language ("SQL") table, a spreadsheet, a comma-separated values ("CSV") file, a word processing file, or other suitable data structure. For brevity and simplicity, nine communications are illustrated in FIG. 3. However, additional communications that are included in communication database 300 but are not shown in FIG. 3 will be introduced below.

Generally speaking, entries in communication database 300 can include the communications provided by the users, e.g., "#BobSmith is having a great season" as illustrated by communication 301. Communication database 300 can also include metadata such as user names of the individual users who provided the communications, e.g., "BigEd." Communication database 300 can also include additional metadata such as the time and/or date that the communication was submitted, e.g., "Jun. 3, 2010, 9:38 AM EDT."

For the purposes of explanation, the communications shown in the example of FIG. 3 generally relate to a baseball team called the Baltimore BlueSox. In some implementations, the communications may be associated with feed for a particular subject, e.g., the BlueSox. As an example, communication platform 121 can be a general-purpose real-time messaging service with a BlueSox-specific feed, as well as other feeds not discussed herein. As another example, the communications platform can be from a blog, microblog, or message board relating to the BlueSox. The communications from the BlueSox feed, blog, or message board can be provided to summarization server 150, summarized using the implementations described herein, and provided on a web page associated with the BlueSox.

Further, many of the communications reference a BlueSox player named "Bob Smith." Some of the communications also include connectors such as hashtags that help identify one or more topics of the communication. For example, communications 301-303, 305, and 307-309 include the hashtag "#BobSmith," communication 304 includes the hashtag "#JohnJones," and communications 306 and 309 include the hashtag "#BlueSox." In some implementations, communications hosted by communication host server 120 and/or stored by summarization server 150 are searchable by hashtag.

Note that, in some implementations, the number of communications is much larger than the examples presented herein, perhaps numbering hundreds or thousands of communications. Furthermore, some of the communications may be unrelated or only tangentially related to hashtags included therein. Under such circumstances, it may be difficult for a user to understand recurring or dominant themes in the communications. Thus, it may be desirable to provide one or more users with a summary of the communications.

Figure 4:
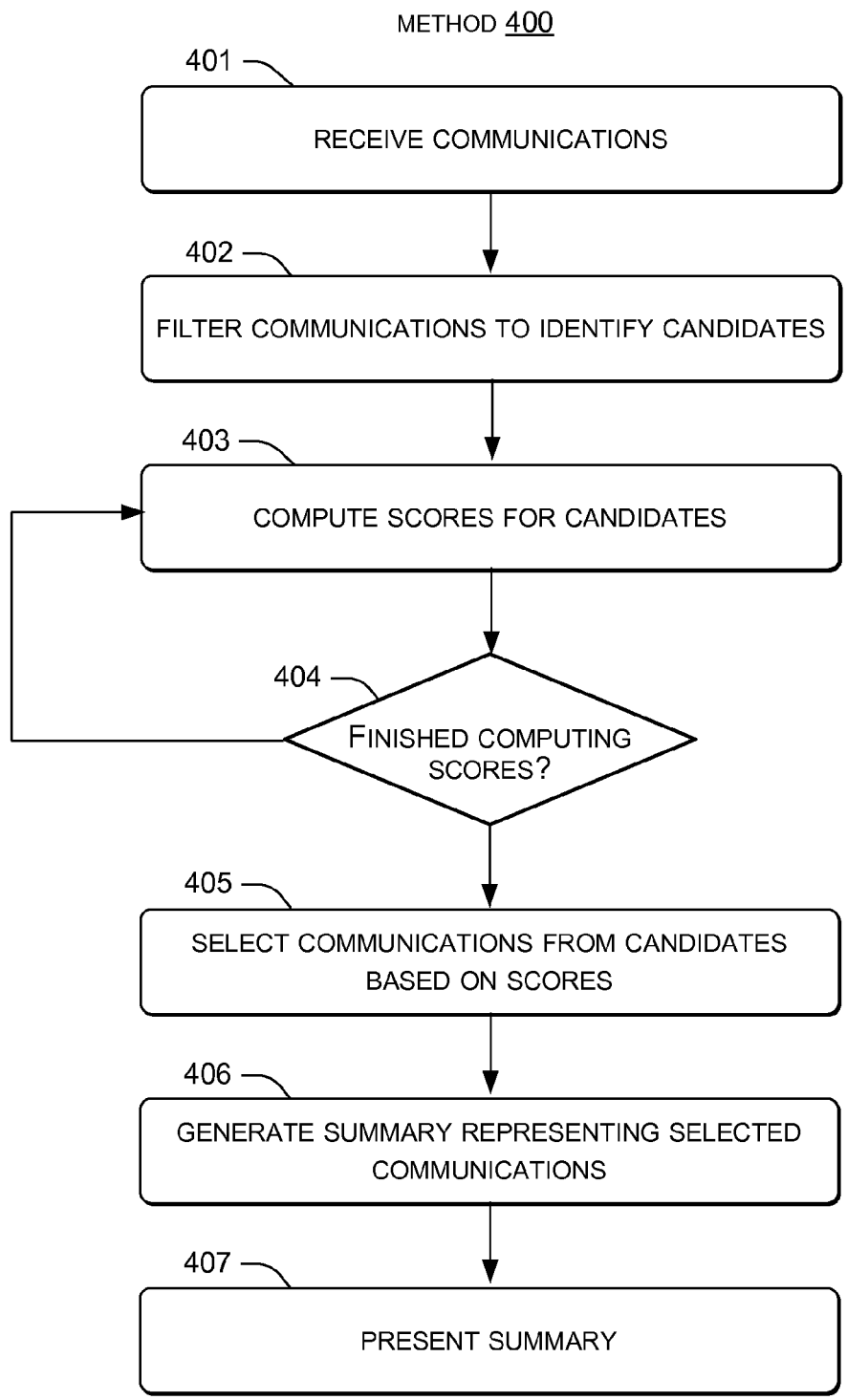
FIGS. 4, 6, and 7 show flowcharts of exemplary methods that can be accomplished in accordance with some implementations of the present concepts.

FIG. 4 illustrates a method 400, also suitable for implementation in system 100 or other systems. Summarization server 150 can implement method 400, as discussed below. Note that method 400 is discussed herein as being implemented on summarization server 150 for exemplary purposes, but is suitable for implementation on many different types of devices.

Communications can be received at block 401. For example, communication storage component 203 can receive communications that are submitted by client devices 130 and/or 140 to communication platform 121. Communication storage component 203 can receive the communications directly from client devices 130 and 140, or may download the communications from communication host server 120.

The communications can be filtered at block 402 to identify candidates to include in a summary. For example, filter component 204 may filter the communications by connector, e.g., hashtag or web link, to identify candidate communications relating to a particular topic. For the purposes of this example, the communications are filtered to identify those communications with the "#BobSmith" hashtag. Thus, in this example, the filtered communications include communications 301-303, 305, and 307-309. As discussed in more detail below, the communications can also be filtered by other criteria, such as user-selectable options for language, time period, geographic location, etc.

Scores may be computed for the filtered candidate communications at block 403. For example, score computation component 205 can compute scores reflecting semantic relationships between two or more of the candidate communications. The scores can be based on one or more metrics reflecting the relative similarity and/or diversity of the various candidate communications. Exemplary similarity and diversity metrics for computing the scores are discussed in more detail below.

Decision block 404 can include determining whether scores have been computed for each of the candidate communications. As shown in FIG. 4, if the scores have not finished computing, method 400 can return to block 403 to continue computing the scores. Alternatively, if scores have been computed for each of the candidate communications, method 400 can move to block 405.

Candidate communications can be selected based on the scores at block 405. For example, summary generation component 206 may select the candidate communications with the highest scores. For the purposes of this example, summary generation component 206 can select four candidate communications. For example, summary generation component 206 can select communication 308 as the highest scoring candidate communication, and communication 301 as the second highest scoring candidate communication, as well as the next two highest-scoring candidate communications (not shown in FIG. 3).

A summary can be generated at block 406. For example, summary generation component 206 can generate a summary of the hashtag "#BobSmith." The summary can represent the selected communications. In the present example, the summary includes the four selected communications, each of which includes the hashtag. More generally, the summary can represent a subset of communications that include and/or reference a connector.

Figure 5:
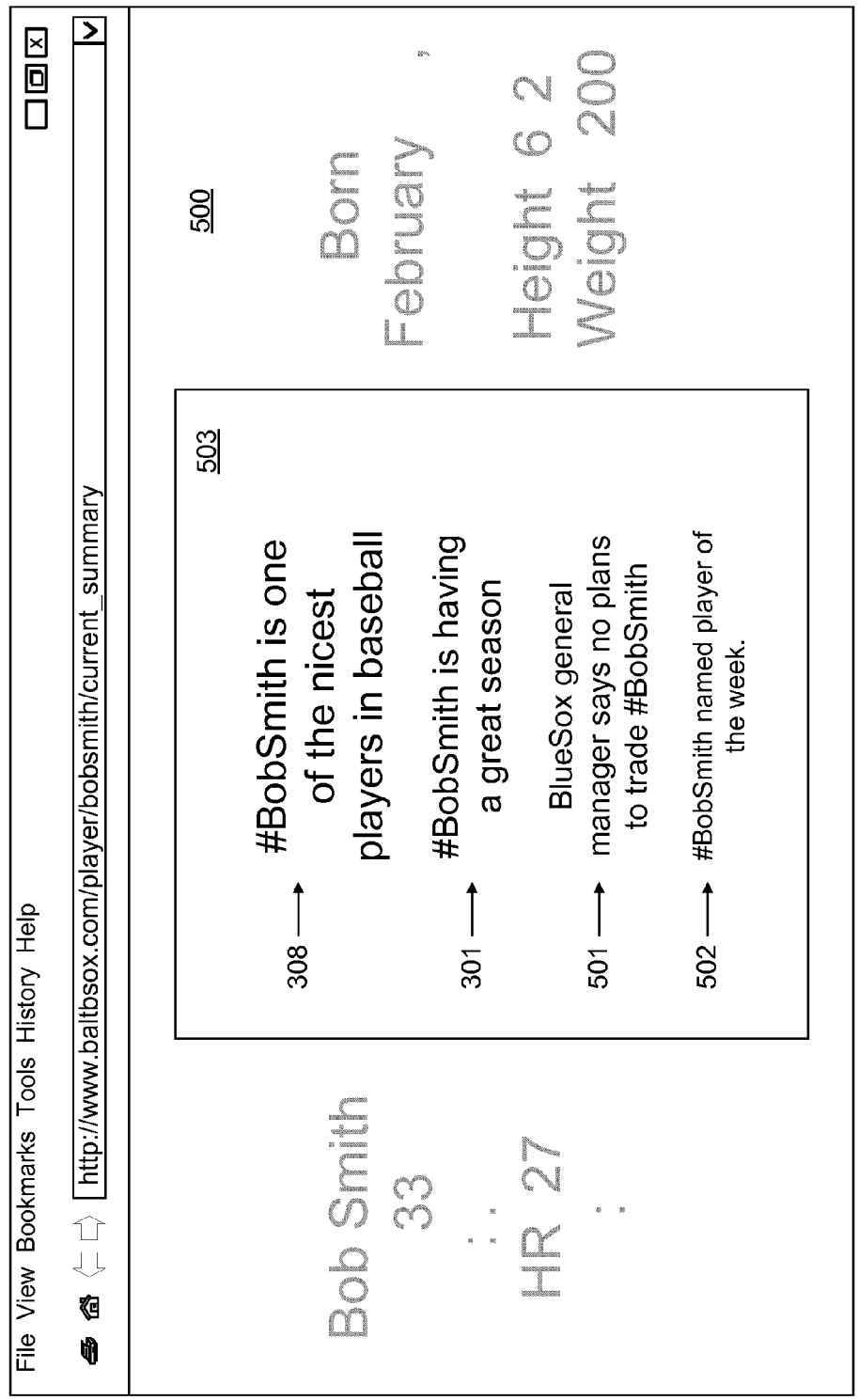
FIGS. 5, 8, and 9 show exemplary graphical user interfaces that can be presented in accordance with some implementations of the present concepts.

The summary can be presented at block 407. For example, the summary can be displayed in a connector summary page 500, as shown in FIG. 5. Connector summary page 500 includes four individual communications 301, 308, 501, and 502. For the purposes of illustration, communications 301, 308, 501, and 502 are collectively included in a summary box 503. Each of communications 301, 308, 501, and 502 includes the hashtag "#BobSmith." Note that, while not shown in FIG. 3, communications 501 and 502 can also be selected for the summary in block 406. Thus, communications 301, 308, 501, and 502 can collectively represent a summary of the hashtag "#BobSmith."

In some implementations, summarization server 150 can send connector summary page 500 as HTML code to client devices 130 and/or 140. Connector summary page 500 can be rendered by the client devices to appear as shown in FIG. 5. In other implementations, summarization server 150 may send the code to communication host server 120, a web server, or any other device with which client devices 130 and 140 can communicate. In other implementations, the summary generated at block 406 can be provided in text format, as part of a feed, as one or more SMS messages, etc.

In some implementations, connector summary page 500 can be displayed with a web page associated with the connector. In FIG. 5, connector summary page 500 includes communications 301, 308, 501, and 502 superimposed over a web page associated with Bob Smith, e.g., a player page on a web site for Bob Smith's team. The player page can include information such as statistics, date of birth, height, weight, and can be displayed as a faded background behind the communications in the summary. More generally, summaries for a given topic can be displayed by superimposing the summaries over web pages associated with the topic.

As also shown in FIG. 5, connector summary page 500 includes four individual communications, 308, 301, 501, and 502 displayed in a manner to reflect the score of the communications that is computed at block 403. For example, the highest-scoring communications may be displayed at the top of connector summary page 500, and/or in a larger font size. Thus, by viewing connector summary page 500, a user can see that communication 308 is the highest-scoring communication, followed by communications 301, 501, and 502. In further implementations, the relative scores of communications in connector summary page 500 may be visually distinguished using other techniques besides the location or font size. For example, techniques such as varying color, font style, underline, bold, italics, etc. can be used to visually distinguish the communications. Note that the communications in the summary can each reflect a theme from the various communications that include the connector #BobSmith. For example, from the communications shown in FIG. 3, communications 302, 305, and 308 generally relate to the idea that Bob Smith is a nice person. In the example shown in FIG. 5, communication 308 is selected for the summary and represents the idea that Bob Smith is a nice person. Likewise, as shown in FIG. 4, communications 301, 303, 307, and 309 generally relate to the idea that Bob Smith is playing well recently. From these communications, communication 301 is selected for the summary and represents the idea that Bob Smith is a nice person. Similarly, communications 501 and 502 can represent other communications from communication database 300 not shown in FIG. 4.

In some implementations, the number of communications for the summary is fixed, e.g., four in the example above. In other implementations, the number of communications can vary depending upon the scores for the individual communications. For example, a threshold can be used, and those communications having a score exceeding the threshold can be included in the summary. In further implementations, the number of communications included in the summary can be determined based on a user-selectable option. For example, a user could request a summary with four communications that reference the hashtag "BobSmith."

As also introduced above, users can be provided with additional selectable options for requesting summaries. As an example, users can have the option of requesting summaries for particular languages. As another example, users can have the option of requesting summaries for particular time periods, e.g., communications from the past 24 hours, communications within a user-defined date and/or time range, etc. In such implementations, block 402 of method 400 can include filtering communications by the user-selected options as well as by the connector. Thus, for example, if a user selects the hashtag "#BobSmith" and requests communications in Spanish for August of 2010, the filtering can identify candidate communications that meet the user's criteria. Note that this can result in fewer candidate communications being input to block 403, which can in turn improve processing efficiency because fewer scores are computed.

Generally speaking, by using method 400 as discussed above, it is possible to provide a representative summary of the communications in communication database 300 that include the connector "#BobSmith." From the various communications that include "#BobSmith," four communications are used in this example to represent four different themes represented by the communications as a whole. Thus, a user having the benefit of such a summary may not need to read all of the communications to understand most, or at least a significant portion, of the information conveyed by the communications that are not included in the summary. This aspect of the disclosed implementations may be particularly beneficial in circumstances where there are a large number of communications including and/or referencing a particular connector.

Score Computation

Figure 6:
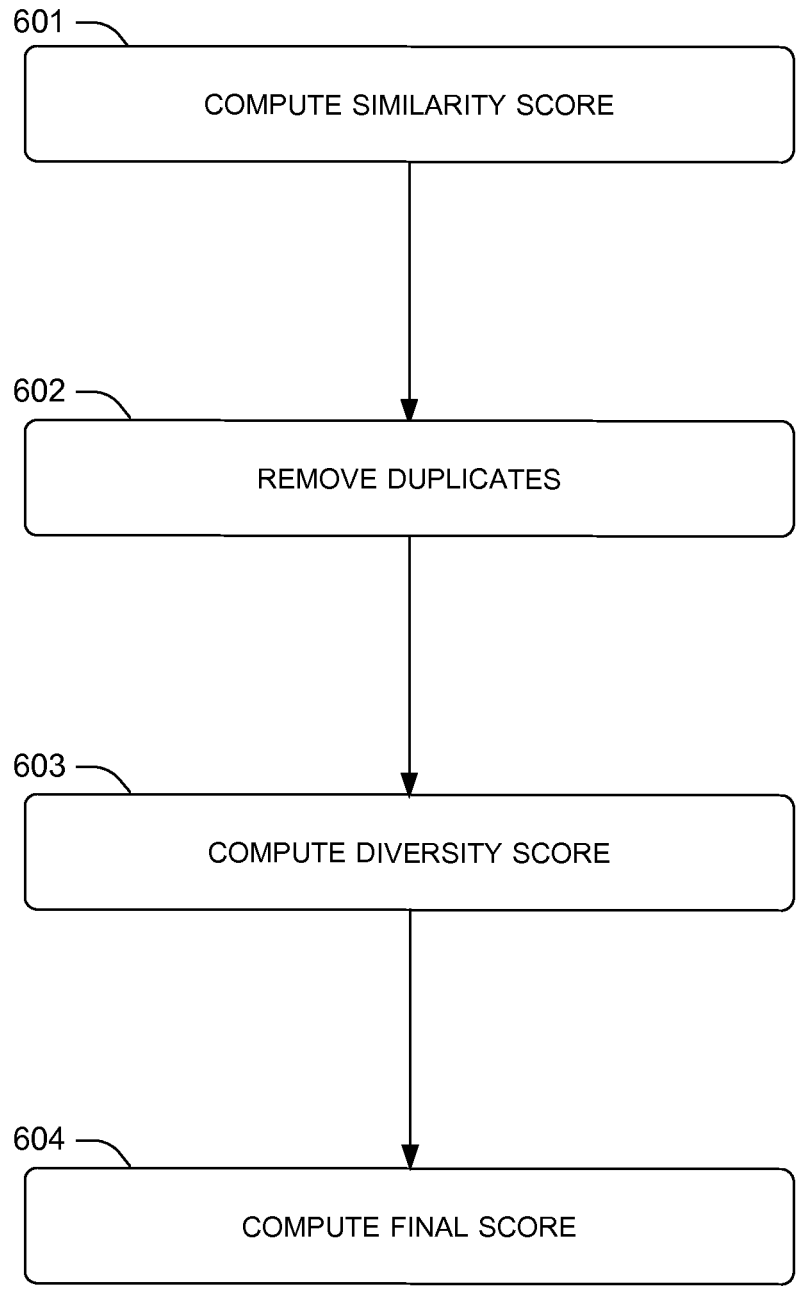

FIG. 6 illustrates a method 600 for computing a score for one or more individual communications. For example, method 600 may be performed as part of processing associated with block 403 as discussed above, and in this context may be considered a detailed view of block 403. Like method 400, method 600 is also suitable for implementation in system 100 or other systems. Score computation component 205 of summarization server 150 can implement method 600, as discussed below. Note that method 600 is shown as being implemented on summarization server 150 for exemplary purposes, but is suitable for implementation on many different types of devices.

Block 601 can include computing similarity scores for the communications in communication database 300, and more particularly for the filtered candidate communications having a common connector, as discussed above with respect to block 402. For example, similarity scores can be computed for a given communication using a similarity metric that reflects the semantic similarity of the communication to the other filtered communications. In some implementations, the similarity metric is a Jaccard similarity represented as a value between 0 and 1. The similarity metric may reflect the similarity between any two or more communications on a word-by-word or character-by-character basis. For example, individual similarity scores for a given communication can be computed for every other filtered communication. These individual similarity scores can be added together to determine a final similarity score for the communication, reflecting the similarity of the communication to the other filtered communications as a whole. In other implementations, the individual similarity scores can be summed for only a subset of the individual communications, e.g., communications in a particular language, timeframe, etc.

Block 602 can include removing duplicate and/or near duplicate communications. For example, communications having a Jaccard similarity exceeding a threshold (e.g., 0.95) may be considered as duplicates and/or near-duplicates. In some implementations, a higher threshold is used for duplicates than for near-duplicates, e.g., 0.95 for duplicates and 0.90 for near-duplicates. In other implementations, other techniques for near-duplicate record detection can be applied to identify and remove duplicates and/or near-duplicates. As an example, a communication such as "#BobSmith is the nicest baseball player" could be considered a near-duplicate of communication 308, "#BobSmith is one of the nicest players in baseball." As another example, a "retweet" can be identified as a duplicate or near-duplicate record at block 602, and removed from the filtered communications. As a further example, a quoted message on a message board without substantial further commentary added to the quoted message can also be removed at block 602.

Block 603 can include computing a diversity score in a manner similar to that discussed above for similarity scores. In some implementations, the diversity score is represented using a metric such a Kullback-Leibler ("KL") divergence, which can be a value between 0 and 1. The diversity metric may reflect the divergence or differences between two or more communications on a word-by-word or character-by-character basis. Maximum entropy techniques can also be applied in block 603 in place of, or in addition to, KL divergence. Generally speaking, block 603 may serve to increase the likelihood that the communications selected for the summary will be sufficiently diverse to reflect different themes from the filtered communications, rather than presenting multiple communications in the summary that have essentially the same meaning.

Block 604 can include computing a final score for the communications. For example, the final score for a given communication can be a combination of the similarity score and the diversity score. In some implementations, the final score can be a weighted sum of the similarity score and the diversity score. Generally speaking, weighting the diversity score more highly than the similarity score may result in a broader range of themes being included in the summary. Similarly, weighting the similarity score more highly may result in a narrower range of themes being included in the summary.

Note that, in some implementations, communications with many duplicate or near-duplicate communications may generally have higher similarity scores, because they can tend to have high individual similarity scores for the other duplicate and/or near-duplicate communications. This can tend to result in a higher final score for these communications, which can in turn be reflected when the summary is displayed by a larger font size, more prominent placement in the display, etc.

Furthermore, note that the implementations discussed herein can use alternative similarity and/or diversity metrics. For example, in addition to Jaccard similarity, Dice coefficients, Levenshtein distance, Cosine Similarity, and/or Hamming distances can be used as similarity metircs. Likewise, Kolmogorov-Smirnov ("KS") tests can be used with or in place of KL divergence as a diversity metric.

The processing discussed above with respect to blocks 601 and 602 can be implemented by computing similarity scores between every permutation of two candidate communications. However, in some implementations, transitivity relationships can be used to reduce the total number of similarity scores that are computed. For example, consider three candidate communications, S1, S2, and S3. If S1 is sufficiently similar to S2 to be considered a duplicate or near-duplicate of S2, and S2 is likewise sufficiently similar to S3 to be considered a duplicate or near-duplicate of S3, then it may follow that S3 is a duplicate or near-duplicate of S1.

Thus, in some implementations, the similarity score between S1 and S3 is not computed when S3 is identified as a duplicate or near-duplicate of a communication (S2) that has already been identified as a duplicate or near-duplicate of S1. By iteratively removing duplicates or near-duplicates as they are identified, the total number of computations for method 600 can be reduced. The extent to which the number of computations is reduced may depend on the distribution of duplicate or near-duplicate candidate communications. In circumstances where there are many duplicate or near-duplicate communications, more computations can be avoided by iteratively removing the duplicate or near-duplicate communications.

Summaries by Characteristic

In many cases, user communications about a particular topic can differ depending on certain characteristics, such as when the communications are submitted by the users. For example, early in a baseball season, many discussions about Bob Smith may relate to his character as reflected in the communications discussed above. Later in the season, Bob Smith may be selected for the All-Star team. As users begin communicating about Bob Smith's All-Star selection, this may become the dominant theme of discussion, superseding discussions about Bob Smith's character as a nice person. Under such circumstances, it may be desirable to provide summaries on a characteristic-specific basis. For example, when the characteristic is time periods, summaries can be provided monthly so that users can see how discussions about certain topics have changed over time. As another example, if the characteristic is language, summaries can be provided for different languages.

Figure 7:
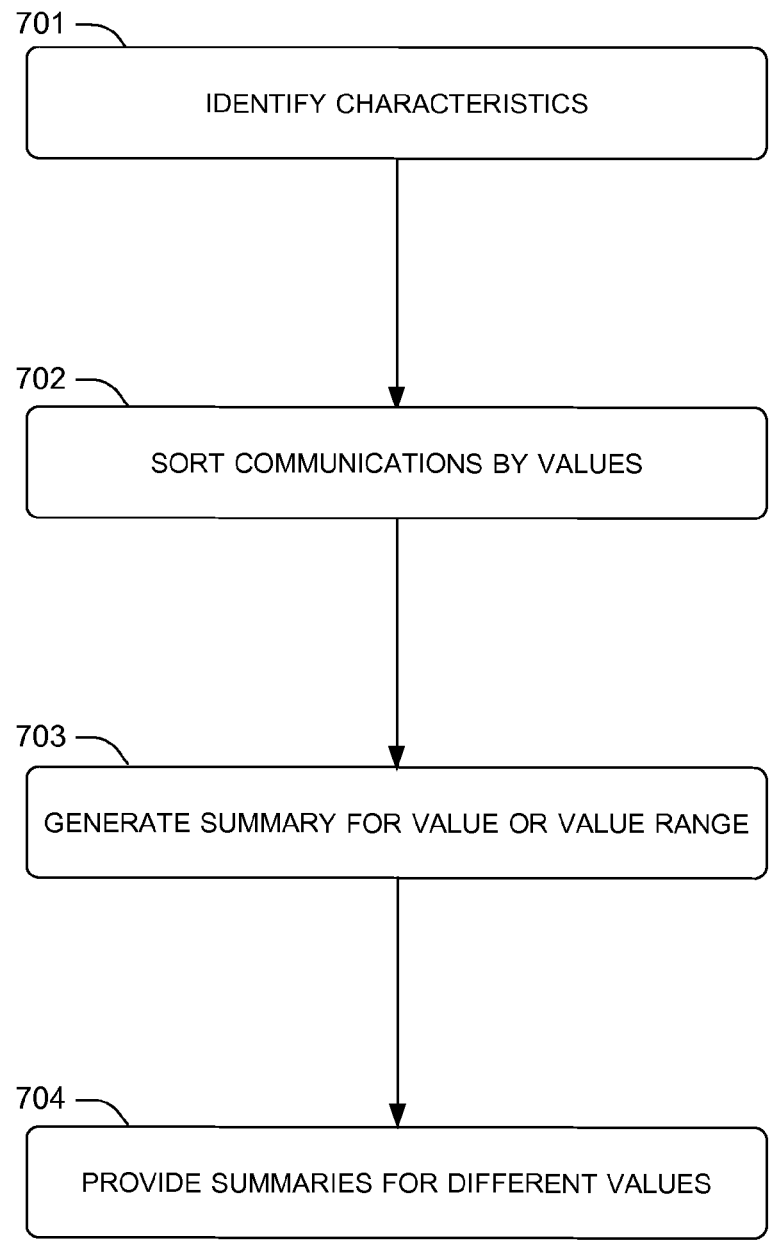

FIG. 7 illustrates a method 700 for summarizing communications by characteristics of the communications. Summarization server 150 can implement method 700, as discussed below. Note that method 700 is shown as being implemented on summarization server 150 for exemplary purposes, but is suitable for implementation on many different types of devices, either in system 100 or other systems. For the purposes of the specific example that follows, the communications are summarized by time period, although the disclosed implementations are also consistent with other characteristics of communications, e.g., language, geographic location, etc.

Characteristics for communications can be identified at block 701. For example, as discussed above, the communications in communication database 300 may have an associated date and/or time characteristic that indicates when the communication was submitted to communication platform 121. In some implementations, the communications may include metadata, such as a timestamp that includes values for the date and/or time. The timestamp can represent when the communications are received by communication platform 121. In other implementations, summarization server 150 may use regular expressions or other techniques to identify time data in the communications.

The communications can be sorted by the values for the characteristics at block 702. For example, the communications can be sorted by month, by year, by day, etc. In some implementations, the communications can be sorted chronologically at block 702. For the purposes of the present example, communications in communications database 300 are sorted into groups for three consecutive months, e.g., June 2010, July 2010, and August 2010. However, note that communications can also be sorted by nonconsecutive and/or overlapping time periods.

A summary can be generated for each value or value range of the characteristics at block 703. For example, method 400 can be applied to the communications for each month, to generate separate summaries for June, July, and August 2010. Note that while this example uses value ranges (e.g., time periods) of relatively equal length, e.g., one month each, the time periods can also vary in length. For example, a first summary could be generated for January-June 2010, and a second summary could be generated for July 2010, etc. Furthermore, summaries can be generated for predetermined time periods, e.g., a well-known event such as the World Series, World Cup, elections, etc.

The summaries can be provided for the different characteristic values at block 704. For example, summarization server 150 may provide the summaries to users in a manner similar to that discussed above with respect to method 400, e.g., as HTML code for a web page. Also as discussed above, summarization server 150 may send the summaries directly to client devices 130 and/or 140 over network 110. Alternatively, summarization server 150 can provide the summaries indirectly, by sending them to communication host server 120 or another device (e.g., a web server) accessible by client devices 130 and/or 140.

Figure 8:
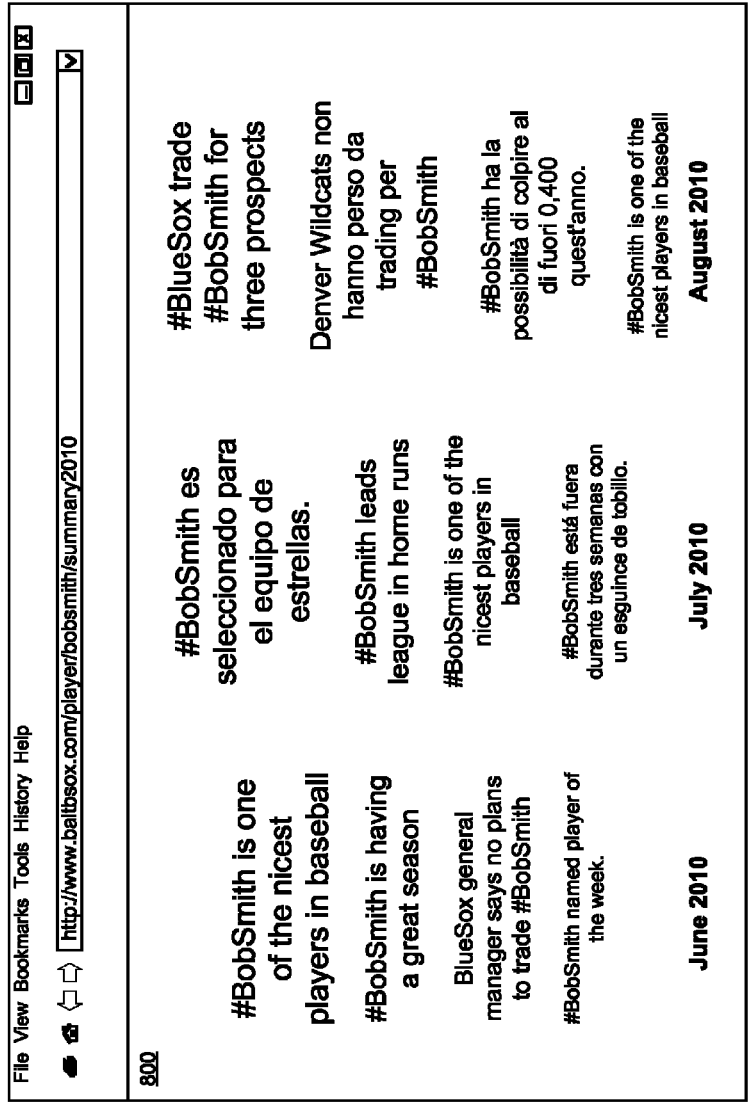

FIG. 8 illustrates an exemplary chronological summary 800 that can be provided by method 700. In this example, chronological summary 800 reflects three consecutive time periods, June, July, and August 2010. As viewed in FIG. 8, the time periods are shown in chronological order from left to right, with later time periods shown to the right of earlier time periods. Thus, by viewing a summary that shows representative communications for different time periods, a user can understand how the conversation themes for a particular topic have changed over time. In some implementations, chronological summaries for a particular topic can be viewed as a narrative for the topic over the time period covered by the chronological summaries.

Chronological summary 800 also illustrates a circumstance where the user has requested communications in English for June 2010, English and Spanish for July 2010, and English and Italian for August 2010. Thus, chronological summary illustrates summarization by two different characteristics of the communications, e.g., time period and language. Note that method 700 can be applied to many different combinations of communication characteristics.

Note also that communications can be filtered and presented based on characteristics other than time periods or language. For example, communications can be filtered by the location from where the communication was originally submitted or received. In such implementations, communication summaries can be presented on a location-by-location basis, e.g., a first summary for Germany, a second summary for Great Britain, etc. The communication summaries can be presented together, e.g., the summary for communications originating in Germany and the summary for communications originating in Great Britain can be combined into a single web page.

Alternatively, location-specific summaries can be provided to individuals depending on where they are located. In such implementations, users in Great Britain could receive the summary of communications originating in Great Britain, and users in Germany could receive the summary of communications originating in Germany. In still further implementations, users can be provided the opportunity to select whether they want to see location-based summaries for a particular location, or location-by-location summaries for several areas at once.

Additional Implementations

The implementations discussed above are but some of many possible implementations. For example, a hashtag was described above as an example of a connector, and communications including a particular hashtag were processed to generate a summary of the hashtag. However, the connector could also be a link to a web page, such as a recent news article.

Figure 9:
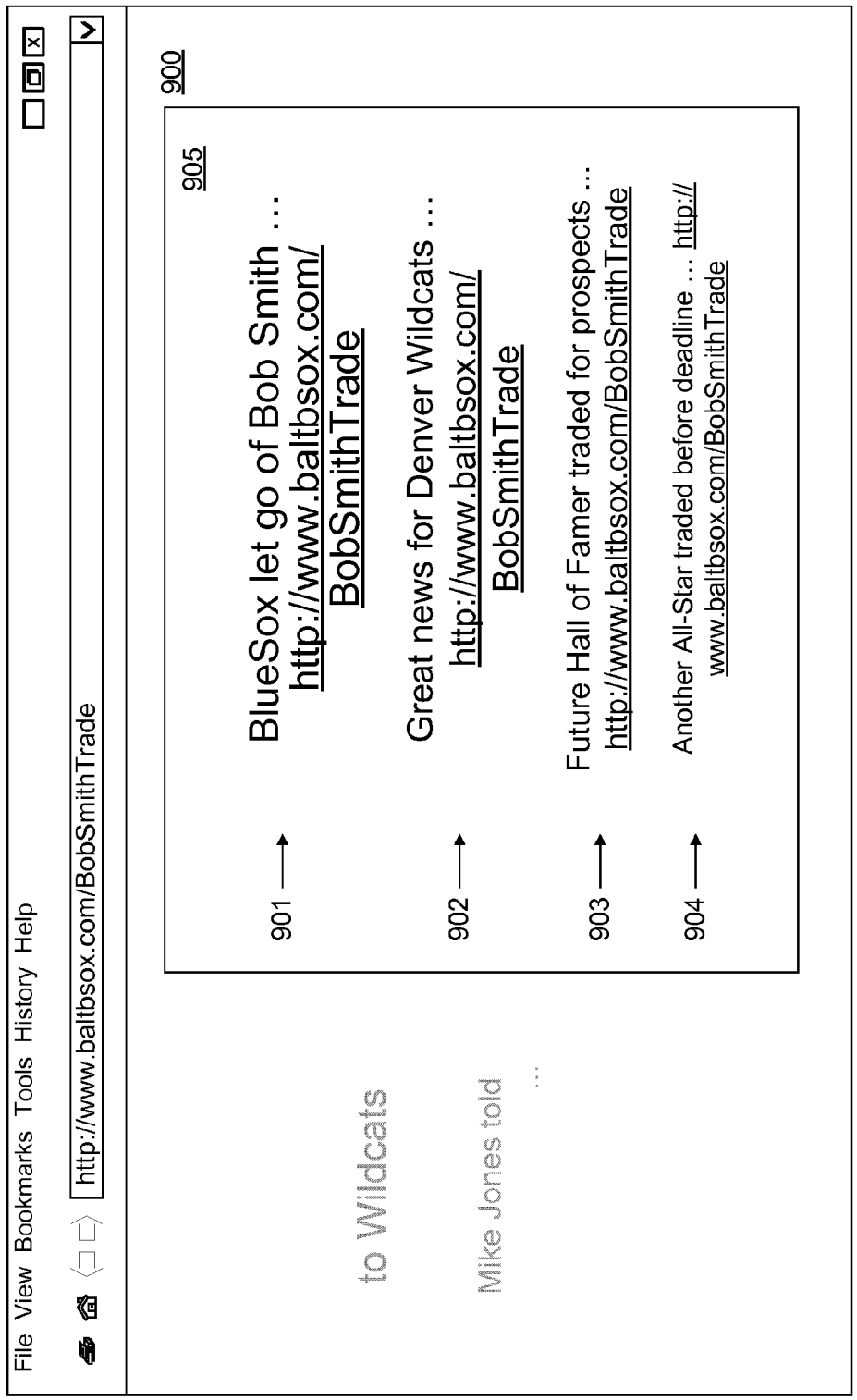

For example, FIG. 9 illustrates an exemplary connector summary page 900. Generally speaking, connector summary page 900 can be a summary of a connector such as a web link, e.g., "http://www.baltbsox.com/BobSmithTrade." Connector summary page 900 can be generated using method 400. In some implementations, the summary can be presented in a manner similar to that shown in FIG. 5. For example, as shown in FIG. 9, communications 901, 902, 903, and 904 are included in a summary box 905. Summary box 905 is superimposed over the news article that is available at the web link for the connector, e.g., http://www.baltbsox.com/BobSmithTrade.

As discussed above, individual words, letters, or combinations thereof can also serve as connectors. For example, instead of a hashtag, phrases such as "Bob Smith," "All-Star," etc. can be used as connectors. In some implementations, users can provide queries to summarization server 150, and summarization server 150 can generate a summary by treating the query terms as connectors.

Furthermore, the disclosed implementations can be used as an alternative to traditional captions or snippets provided by a web search engine. Generally speaking, a user who enters a query to a web search engine may receive a list of web pages matching the search, and associated snippets which generally can include text taken from the web page, such as the first paragraph, an abstract, etc. In some implementations, summaries generated using method 400 can be used as snippets to replace and/or supplement traditional search engine snippets. Thus, users of the search engine can be presented with a snippet that is based on a summary reflecting the viewpoints of different users.

As also discussed, the concepts presented herein can be used to present summaries that include communications from different languages. For example, given a communications database that includes communications in several different languages, a single summary for a given connector can be generated that includes a sentence in more than one of the languages. This can be a result of the scoring methodology disclosed above, because communications in the same language may generally have relatively high similarity scores to each other, and at the same time may generally exhibit relatively high diversity scores when compared with communications in other languages.

Note that the exemplary communications presented herein generally include complete sentences. However, in some cases, users may tend to communicate using "textual fragments" that are not necessarily complete sentences. The implementations discussed above are consistent with communications that include only textual fragments, as well as communications that include complete sentences.

Furthermore, in some implementations, the communications do not necessarily need to be embodied as text. For example, the communications could be appended as metadata to multimedia files such as images, video, or audio. Furthermore, communications can be extracted from images, video, or audio using optical character recognition and/or speech recognition techniques, and processed using the disclosed implementations.

CONCLUSION

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system comprising:
   at least one processing unit; and
   at least one computer-readable storage media storing instructions which, when executed by the at least one processing unit, cause the at least one processing unit to:
   store a plurality of communications, the plurality of communications including a subset of individual communications that mention a common hashtag and other communications that do not mention the common hashtag, wherein the common hashtag begins with a "#" symbol in each individual communication of the subset;
   filter the plurality of communications to identify the common hashtag referenced in each individual communication of the subset;
   compute scores reflecting semantic relationships between the individual communications of the subset that mention the common hashtag;
   select one or more of the individual communications of the subset that mention the common hashtag based on the scores; and
   generate a summary of the common hashtag, the summary representing the one or more selected individual communications of the subset that mention the common hashtag.

2. The system according to claim 1, wherein the common hashtag comprises a name of a person preceded by the "#" symbol.

3. The system according to claim 1, wherein the summary includes the one or more selected individual communications.

4. The system according to claim 3, wherein the instructions cause the at least one processing unit to:
   generate a web page that includes the one or more selected individual communications; and
   send the web page to a client device.

5. The system according to claim 4, wherein the instructions cause the at least one processing unit to:
   generate the web page such that scores for the one or more selected individual communications are reflected in the web page by visual characteristics of the one or more selected individual communications.

6. The system according to claim 5, wherein the visual characteristics comprise one or more of font size, font type, font color, or relative placement of the one or more selected individual communications on the web page.

7. The system according to claim 6, wherein higher-scoring selected individual communications have a larger font size than lower-scoring selected individual communications.

8. The system according to claim 1, wherein the other communications that do not include the common hashtag include other hashtags.

9. The system according to claim 1, wherein the instructions cause the at least one processing unit to:
   compute the scores based on a similarity metric and a diversity metric.

10. The system according to claim 9, wherein the similarity metric is a Jaccard similarity and the diversity metric is a Kullback-Leibler ("KL") divergence.

11. One or more computer-readable memory devices or storage devices comprising instructions which, when executed by one or more processing devices, cause the one or more processing devices to perform acts comprising:
    obtaining a plurality of text communications;
    filtering the plurality of text communications to distinguish a subset of text communications that share a common text string from other text communications that lack the common text string;
    identifying a characteristic of the subset of text communications that share the common text string;
    sorting the subset of text communications that share the common text string into at least a first group of first text communications having first values for the characteristic and a second group of second text communications having second values for the characteristic;
    generating a first summary for the first group of first text communications that share the common text string, the first summary representing at least two of the first text communications from the first group; and
    generating a second summary for the second group of second text communications that share the common text string, the second summary representing at least two of the second text communications from the second group.

12. The one or more computer-readable memory devices or storage devices according to claim 11, wherein:
    the first values correspond to a first time period,
    the second values correspond to a second time period that is subsequent to the first time period,
    the first group of first text communications occurred during the first time period,
    the second group of second text communications occurred during the second time period that is subsequent to the first time period,
    the first summary represents the first group of first text communications that occurred during the first time period, and
    the second summary represents the second group of second text communications that occurred during the second time period.

13. The one or more computer-readable memory devices or storage devices according to claim 12, the acts further comprising:
    presenting the first summary and the second summary in chronological order.

14. The one or more computer-readable memory devices or storage devices according to claim 11, wherein:
    the first values correspond to a first geographic location,
    the second values correspond to a second geographic location, the first group of first text communications were originally submitted from the first geographic location, the second group of second text communications were originally submitted from the second geographic location, the first summary represents the first group of first text communications that were originally submitted from the first geographic location, and the second summary represents the second group of second text communications that were originally submitted from the second geographic location.

15. The one or more computer-readable memory devices or storage devices according to claim 11, the acts further comprising:

identifying the first values and the second values in metadata associated with the plurality of communications.

16. A method performed by at least one processing unit of a computing device, the method comprising:

filtering a plurality of communications to identify a subset of the communications that each refer to a common hashtag or a common web link;

computing similarity scores for the identified subset of the communications, the similarity scores reflecting semantic similarities among individual communications of the subset;

computing diversity scores for the identified subset of the communications, the diversity scores reflecting semantic differences among individual communications of the subset;

combining the similarity scores and the diversity scores to determine total scores for the identified subset of the communications;

selecting one or more of the individual communications based on the total scores; and generating a summary of the common hashtag or common web link referred to by each of the communications of the subset, the summary representing the one or more selected individual communications.

17. The method according to claim 16, further comprising:

removing duplicate or near-duplicate communications from the identified subset based on the similarity scores.

18. The method according to claim 17, wherein the removing is performed before computing the diversity scores.

19. The method according to claim 16, wherein the combining comprises adding the similarity scores and the diversity scores for the individual communications of the subset.

20. The method according to claim 16, wherein the common hashtag identifies a person.

* * * * *